(12) United States Patent
Latypov et al.

(10) Patent No.: US 6,563,489 B1
(45) Date of Patent: May 13, 2003

(54) SYSTEM FOR PLACING A SUBJECT INTO VIRTUAL REALITY

(76) Inventors: Nurakhmed Nurislamovich Latypov, 5 Voikovsky proezd. d. 10, kv. 31, Moscow (RU); Nurulla Nurislamovich Latypov, ulitsa Moldagu-lovoi, d. 3, korpus 3, kv. 3, Moscow (RU)

( * ) Notice: Subject to any disclaimer, the term of this patent is extended or adjusted under 35 U.S.C. 154(b) by 0 days.

(21) Appl. No.: 09/423,217
(22) PCT Filed: Apr. 29, 1998
(86) PCT No.: PCT/RU98/00133
§ 371 (c)(1),
(2), (4) Date: Nov. 4, 1999
(87) PCT Pub. No.: WO98/50884
PCT Pub. Date: Nov. 12, 1998

(30) Foreign Application Priority Data

May 6, 1997 (RU) .............................. 97107572

(51) Int. Cl.⁷ ................................. G09G 5/08
(52) U.S. Cl. ................ 345/164; 345/156; 434/59
(58) Field of Search ................. 345/163, 164; 482/66, 69; 119/20; 280/206; 475/25; 434/59

(56) References Cited

U.S. PATENT DOCUMENTS

| 4,389,047 A | * | 6/1983 | Hall .......................... 272/69 |
| 4,489,932 A | * | 12/1984 | Young ........................ 272/28 |
| 4,514,347 A | * | 4/1985 | Reed .......................... 264/32 |
| 4,856,771 A | * | 8/1989 | Nelson et al. ................. 272/18 |
| 4,856,996 A | | 8/1989 | Henson |
| 4,995,603 A | | 2/1991 | Reed |
| 5,182,150 A | | 1/1993 | Carlos et al. |
| 5,349,533 A | | 9/1994 | Libby |
| 5,490,784 A | | 2/1996 | Carmein |
| 5,533,933 A | * | 7/1996 | Garnjost et al. .............. 472/60 |
| 5,551,920 A | * | 9/1996 | Ogden et al. ................. 472/59 |
| 5,860,811 A | * | 1/1999 | Henderson ................... 434/255 |
| 6,128,130 A | * | 10/2000 | Zobel, Jr. et al. ............ 359/443 |
| 6,135,928 A | * | 10/2000 | Butterfield ................... 482/69 |

FOREIGN PATENT DOCUMENTS

EP          0 667 603 A1     8/1995

* cited by examiner

Primary Examiner—Steven Saras
Assistant Examiner—Alecia D. Nelson
(74) Attorney, Agent, or Firm—Pennie & Edmonds LLP

(57) ABSTRACT

A system for immersing a user in virtual reality comprises a closed sphere-shaped capsule defining a real environment, the capsule being installed on supports so that to rotate around its center and having at least one hatch equipped with a door to let the user in and out. The system includes virtual environment generating means and means for displaying the virtual environment to the user, connected to the virtual environment generating means. The system further comprises a unit for changing the virtual environment responsive to actual physical movements made by the user inside the capsule, and means for determining an amount and direction of user's movement relative to the capsule, connected to the virtual environment changing unit. The capsule rests on at least three wheel supports having pivot shafts directed toward the sphere center and offset relative to a rotational axis of the wheel.

21 Claims, 7 Drawing Sheets

SYSTEM FOR PLACING A SUBJECT INTO VIRTUAL REALITY

FIELD OF THE INVENTION

The present invention generally relates to computer games, training systems of aerospace, sportive and military designation, and more particularly, to a system for immersion of a user in virtual reality.

The invention can be employed for entertainment of children and adults. Apparatuses for computer games can be installed indoors, outdoors, or in video game rooms. The system is applicable to teach and practice military men, sportsmen, pilots and to train people in various professions, for example, policemen. It may be also useful to investigate human's behavior in a virtual computer-generated environment.

BACKGROUND OF THE INVENTION

Virtual reality is something that enables a person to move in a three-dimensional environment with six degrees of freedom and to view this environment in real time. This means that a program specifies and an apparatus recognizes six types of movement: forward/backward, upward/downward, leftward/rightward, bend upward/downward, turn leftward/rightward and roll leftward/rightward. Virtual reality is a simulation of physical reality.

Virtual reality gives a user a rear chance to feel, almost in real fashion, as being in some other world. In this world, users can see one another, talk and interact in a three-dimensional environment, appreciate colors and sounds. Such immersion creates the impressive illusion of being there. This effect is attained through the use of devices, such as a helmet with headphones and a joystick sensitive to spatial displacement.

Virtual reality generating means generally comprise a high-speed computer including a 3-D graphic accelerator, from a simple personal computer to a super-computer, and virtual reality software, such as VIRTUS VR, VIRTUS WALKTHROUGH PRO, SUPERSC APE VRT, VRCREATOR, etc.

Virtual reality display means, i.e. audio/imaging means are monitors of various types, helmet mounted displays HMD (Head Mounted Display) or CAVE (Cave Automatic Virtual Environment).

Means for interactive interaction with virtual reality, conventional input/output devices, special 3-D computer mice, gloves, joysticks and tracking apparatuses, e.g. CYBERGLOVE available from Virtual Technologies, follow almost any movement which a hand is capable of.

Tracking means enable the user's hands, feet and body position and orientation in a real environment to be determined and displayed in a virtual environment. Tracking systems vary in the motion display principle, and may be based on mercury balancers, radio, ultrasonic, laser, etc.

Game DOOM available from ID Software, disclosed in Encyclopedia of Computer Games, Saint-Petersburg, 1995, pages 119–122, comprises a conventional set of means for creating virtual reality in its simplest form, which was available seven-eight years ago. This set includes a stationary computer, a color monitor to open a "window" to a virtual environment which seems to be lying at the other side of the screen. A manipulator, such as a joystick or a keypad, gives a possibility to control movements, turns and view in any horizontal direction in the virtual environment.

The above game, however, does not provide full immersion in virtual reality, as the virtual environment is seen through the "window" defined by boundaries of a kinescope screen. Movement is controlled by hand through the manipulator. The system fails to interactively display user's movements in the virtual environment.

More powerful computers and advanced audio/imaging means have given rise to virtual reality displaying apparatus, such as a stereoscopic monitor or a projector worn on the user's head like a helmet or glasses, which provides a possibility to see a 3-D image (see, e.g. Mir PK, No. 1, 1995, pages 164–175).

In the above apparatus, a virtual environment appears as a full-size world extending beyond the screen boundaries and surrounding the user. In addition to the horizontal view, the possibility is provided to look upward/downward at some angle. Manipulators, such as a 3-D mouse, gloves, permit interaction with, objects. They either respond to the interaction by a predictable reaction, or deform. The apparatus enables a person to immerse in a virtual environment, to feel as being inside this virtual environment and to interact with objects.

However, objects and movements are controlled through manipulators, this prohibiting identification of movements both in a virtual and real environment.

Recently, new developments have appeared which provide almost full immersion of a user in a virtual environment.

A prior art system for immersion of a user in virtual reality comprises a sphere-shaped closed capsule defining a real environment, the capsule being disposed on wheel supports so that to rotate around its centre, and having at least one hatch with a door for user's entry and exit, virtual environment generating means, and means for displaying the virtual environment to the user, connected to the virtual environment generating means (see e.g. U.S. Pat. No. 5,490,784, 1996).

The above system exhibits improved capabilities for immersing a user in virtual reality. At least one of the support wheels is a drive wheel and provides rotation of the sphere around its centre. Mounted inside the sphere are actuators in the form of two platforms for each of the user's feet. The platforms are secured on pivots which are, in turn, attached to a supporting surface inside the sphere. The platforms, however, only allow the simulation of user's walking on the same place by alternatively lifting and lowering feet without a displacement forward or backward.

The prior art system does not permit the user to naturally move over the sphere inner surface, actually relocating relative to the supporting surface.

SUMMARY OF THE INVENTION

It is an object of the present invention to provide a system for immersing a user in virtual reality, wherein the implementation of a support for positioning a capsule, and the use of a unit for changing a virtual environment responsive to user's actual physical movements, enable the user to unrestrictedly move inside the capsule to any side at any number of steps owing to free rotation of the capsule on supports, thereby providing a fuller immersion of the user in virtual reality.

The above object is accomplished in a system for immersing a user in virtual reality, comprising a closed sphere-shaped capsule defining a real environment, the capsule being installed on supports so that to rotate around its centre and having at least one hatch with a door for entry and exit of the user, virtual environment generating means, and virtual environment displaying means for displaying the virtual environment to the user, connected to the virtual environment generating means, wherein in accordance with invention said system comprises:

a virtual environment changing unit for changing the virtual environment responsive to actual physical movements made by the user inside the capsule, user's movement amount and direction determining means for determining amount and direction of a movement of the user relative to the capsule, connected to the virtual environment changing unit, at least three wheel supports having pivot shafts directed toward the centre of the sphere and offset relative to a rotational axis of the wheel.

The system preferably comprises a sphere rotation angle sensor connected to the virtual environment changing unit, the sphere rotation angle corresponding to an amount and direction of the user's movement relative to the inner surface of the sphere.

The sphere rotation angle sensor is advantageously a mouse comprising two rollers mounted perpendicular to one another so that to rotate and contact the sphere surface, the sphere being used as a ball of the mouse.

The means for determining an amount and direction of the user's movement relative to the capsule preferably comprises a plurality of sensors determining a position of parts of the user's body.

The means for determining an amount and direction of the user's movement relative to the capsule is preferably a mouse having two rollers mounted perpendicular to one another so that to rotate and contact the sphere surface, the sphere being used as a ball of the mouse.

The capsule can be advantageously made of a set of at least one type of identical members rigidly connected therebetween and having a surface curvature specified by a predetermined curvature of the sphere.

The members are preferably selected from the group including triangles, rectangles, pentagons and hexagons.

It is also preferable that each of the wheel supports comprises at least one wheel.

The wheel supports are preferably secured on a frame.

The system advantageously comprises a platform installed inside the sphere on wheel supports having pivot shafts directed toward the centre of the sphere and offset relative to a rotational axis of the wheel.

The system preferably comprises at least one additional sphere-shaped closed capsule in accordance with a number of additional users, the additional capsule defining a real closed space and being installed on supports so that to rotate around its centre, the additional capsule having at least one hatch with a door;

at least one additional means for displaying the virtual environment to an additional user, connected to said virtual environment generating means, to provide interactive interaction between the users.

The system advantageously comprises a pulse and/or blood pressure sensor connected to said virtual environment changing means to adjust the virtual environment displayed to the user.

The system preferably comprises means for temperature and air content control in the sphere.

The capsule is advantageously made of a radio transparent material.

The system preferably comprises a driver for adapting available programs for immersion in the virtual environment using the sphere.

The object of the invention is also attained in a system for immersing a user in virtual reality, comprising a sphere-shaped closed capsule defining a real environment, the capsule being installed on supports so that to rotate around its centre, and having at least one hatch with a door for entry and exit of the user, virtual environment generating means, and virtual environment displaying means for displaying the virtual environment to the user, connected to the virtual environment generating means, the system in accordance with the invention comprising virtual environment changing means for changing the virtual environment responsive to actual physical movements made by the user inside the capsule;

means for determining an amount and direction of user's movement relative to the capsule, connected to the virtual environment changing means, the support for the capsule being gyroscopic.

BRIEF DESCRIPTION OF THE DRAWINGS

The present invention will be apparent from the following description of its embodiments, taken in conjunction with the accompanying drawings in which.

DESCRIPTION OF THE PREFERRED EMBODIMENTS

Figure 1:
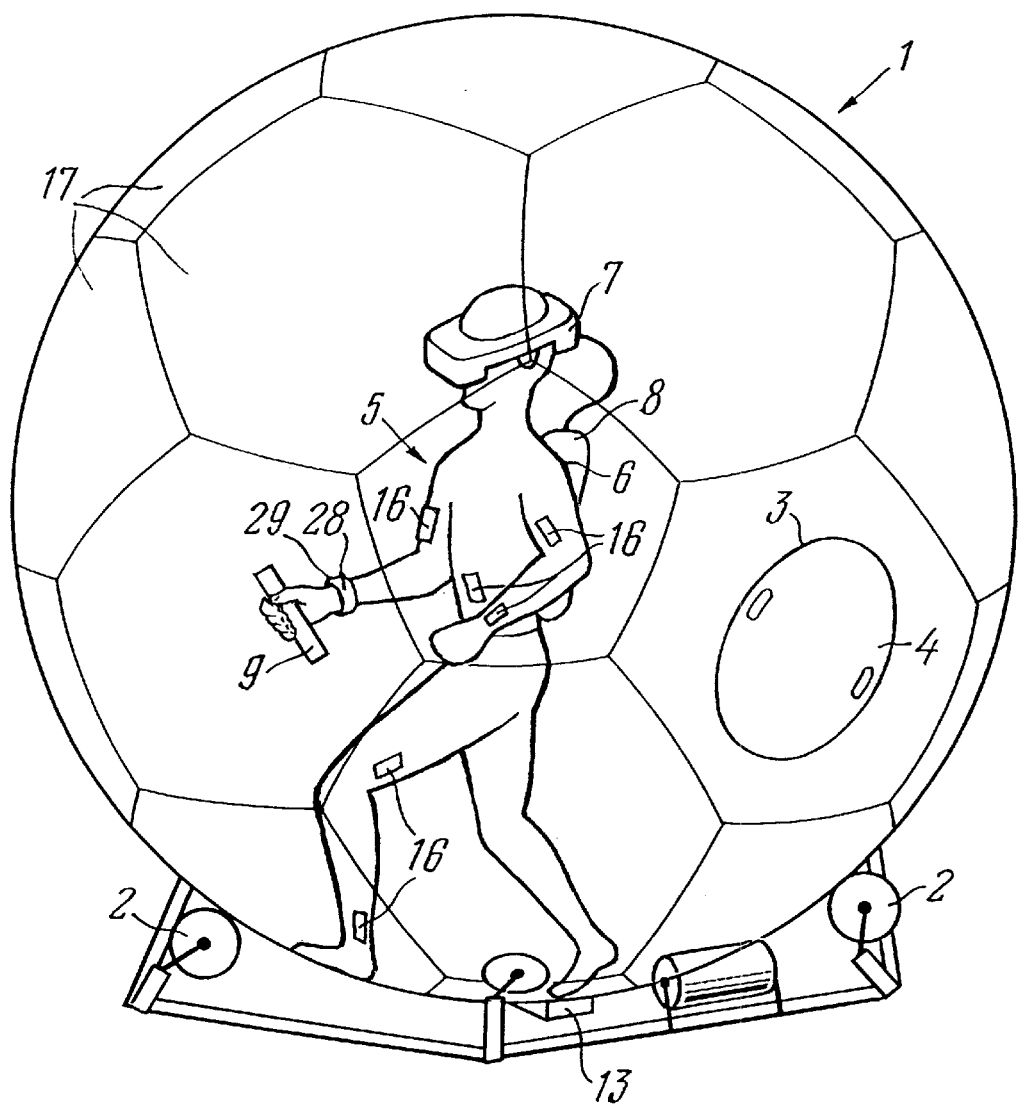
FIG. 1 shows a general view of a system for immersing a user in virtual reality, in accordance with the present invention.

Referring to the drawings, a system for immersing a user in virtual reality, shown in FIG. 1, comprises a sphere-shaped closed capsule 1 defining a real environment and disposed on supports 2, the capsule being rotatable around its centre "O". The sphere 1 has at least one hatch 3 equipped with a door 4 to let a user 5 in and out.

The system comprises virtual environment generating means 6, such as a portable computer, disposed on the user. Means 7 for displaying a virtual environment to the user is a helmet worn on the user's head and having a display to present a virtual or real three-dimensional environment to the user, the display being positioned in the helmet in front of the user's eyes. The means 7 is connected to virtual environment generating means 6.

The system comprises a unit 8 for changing the virtual environment responsive to actual physical movements made by the user inside the capsule 1, the unit 8 being designed to run an additional virtual environment changing program.

The user 5 has a joystick 9 in his hand to manipulate when interacting with virtual environment objects displayed to him on display screens.

The system comprises means for determining an amount and direction of user's movement relative to the capsule, connected to the virtual environment changing unit 8.

The supports 2 (FIG. 2a) are at least three wheel supports having pivot shafts 10 mounted in bearings 11. Geometrical axes a—a of the pivot shafts 10 are directed toward the centre "O" of the sphere 1 and offset relative to a wheel rotational axis 12 by a value "b" approximately equal to a wheel radius r. This permits the wheel to turn when the sphere changes the direction of its rotation and to revolve in different direction (FIG. 2b), thereby providing the possibility to roll on the wheels to any side.

The system further comprises a sphere rotation angle sensor 13 (FIG. 1) connected to the virtual environment changing unit 8, the rotation angle of the capsule 1 corresponding to an amount and direction of the user's 5 movement relative to the inner surface of the sphere.

Figure 3:
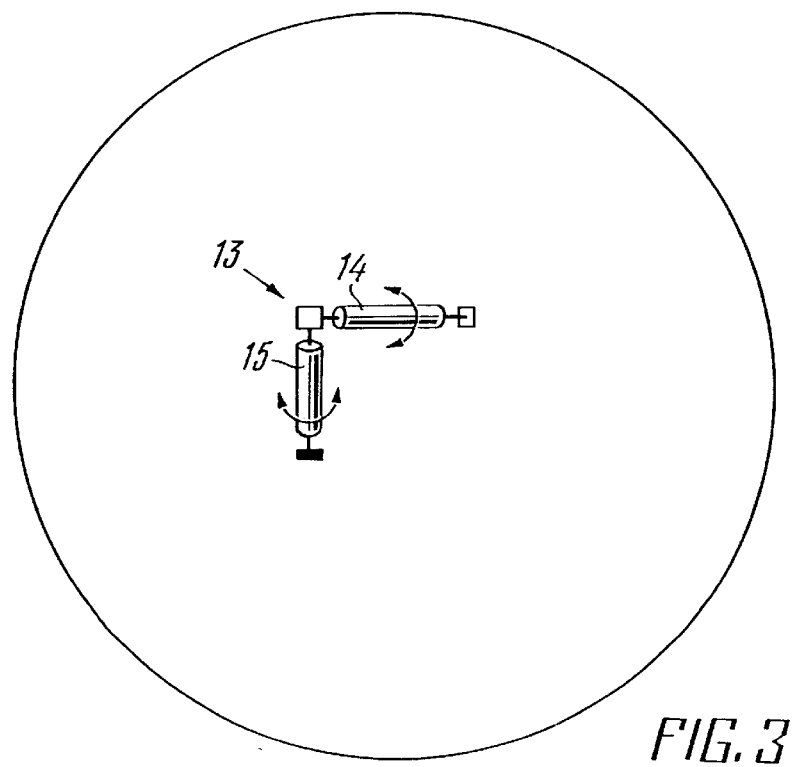
FIG. 3 shows a sphere rotation angle sensor implemented as a computer mouse (bottom view), in accordance with the invention.

In the above embodiment, the sphere rotation angle sensor 13 (FIG. 3) is in the form of a computer mouse comprising two rollers 14, 15 mounted perpendicular to one another so that to rotate and contact the capsule 1 surface. In one embodiment, rollers 14 and 15 can be mounted at an angle greater or smaller than the square angle. The capsule 1 is used as a ball of the mouse.

The means for determining an amount and direction of user's movement relative to the capsule comprises a plurality of sensors 16 mounted on the user 5 to determine a position of parts of the user's body.

In one embodiment, the means for determining an amount and direction of user's movement relative to the capsule is a sphere rotation angle sensor 13 made as a computer mouse.

Figure 4:
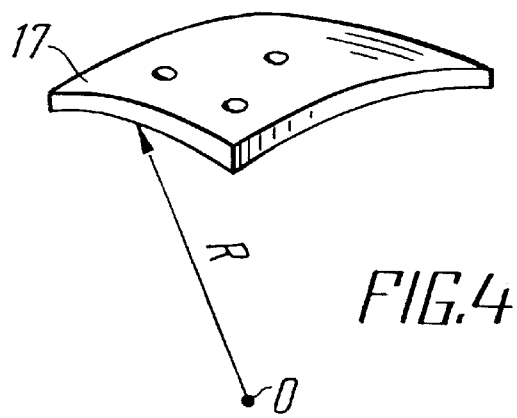
FIG. 4 shows a general view of one of members forming the capsule, in accordance with the invention.
Figure 5A:
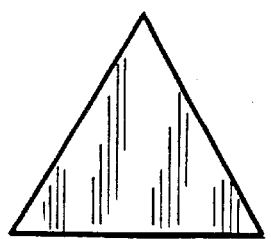
FIG. 5 shows various shapes of the capsule members, in accordance with the invention.
Figure 5B:
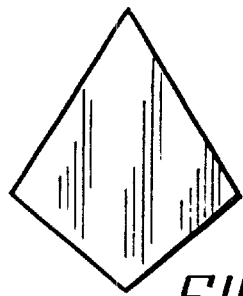
Figure 5C:
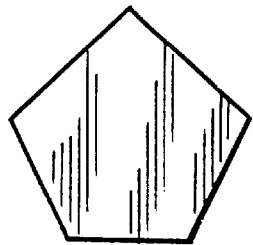
Figure 5D:
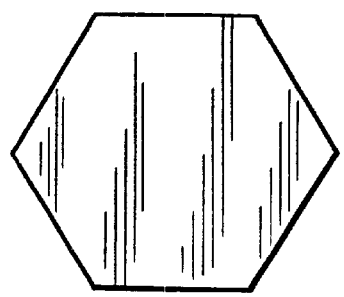

The capsule 1 (FIG. 1) is made of a set of at least one type of identical panels 17 which are rigidly connected with one another, e.g., by pins, screws, welds, adhesive, brackets, etc. The panels 17 have surface curvature R (FIG. 4) specified by a predetermined curvature of the sphere.

To form the sphere, the use may be made of triangles (FIG. 5), rectangles, pentagons and hexagons having a surface curvature specified by a predetermined curvature of the sphere.

Figure 6:
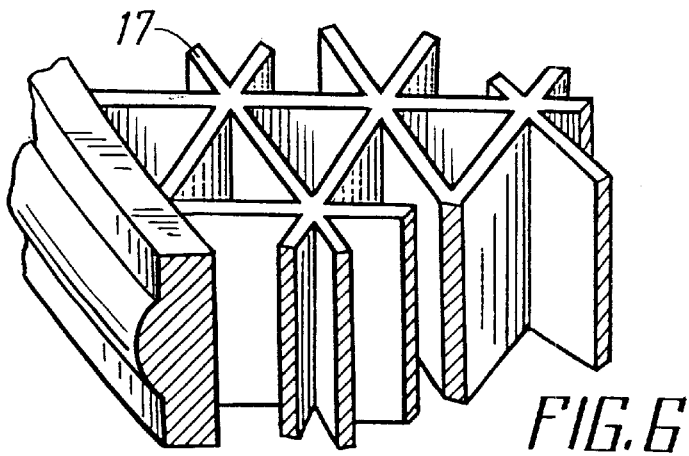
FIG. 6 shows a general view of a capsule member having a cellular structure (partial cut out), in accordance with the invention.

The panels 17 may have perforations 18 (FIG. 4) for free admission of air into the sphere, or, to provide a lighter weight structure while maintaining the required strength properties, the panels 17 may have a cellular structure (FIG. 6).

Figure 7:
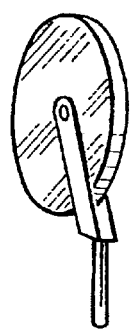
FIG. 7 shows a general view of a support having a single wheel, in accordance with the invention.
Figure 8:
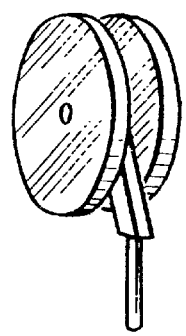
FIG. 8 shows a general view of a support having two wheels, in accordance with the invention.
Figure 9:
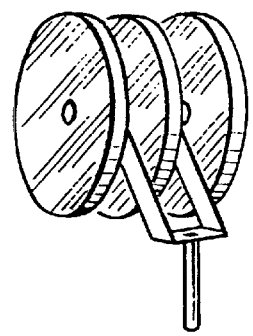
FIG. 9 shows a general view of a support having three wheels, in accordance with the invention.

Each of the wheel supports 2 comprises at least one wheel (FIG. 7). Embodiments with two wheels (FIG. 8) or three wheels (FIG. 9) are also possible.

Figure 10:
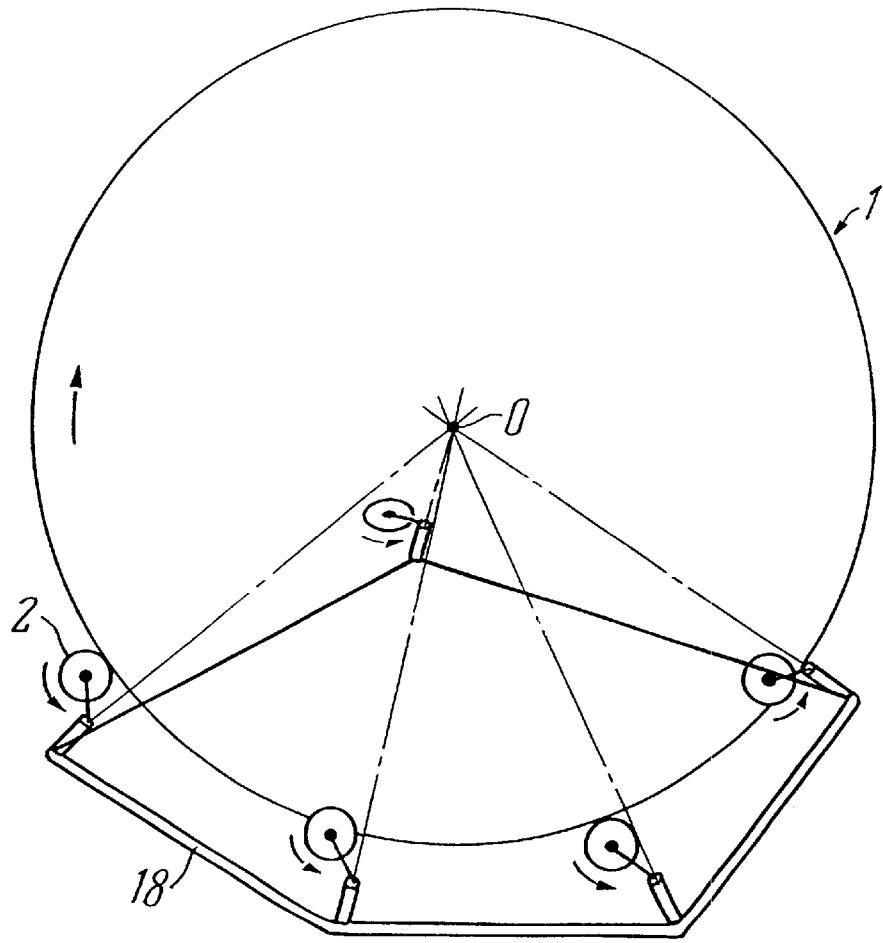
FIG. 10 shows a general view of a frame having five wheel supports secured thereon, in accordance with the invention.

The wheel supports 2, onto which the sphere rests, are secured on a frame 18, as shown in FIG. 10. Here, the frame is pentagon-shaped with five wheel supports 2 secured thereon.

Figure 2A:
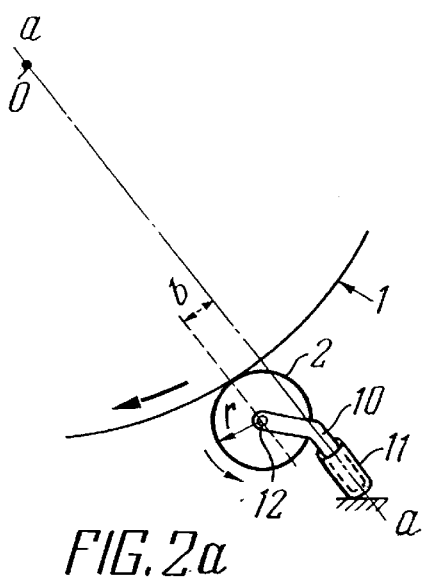
FIGS. 2a, b shows a supporting wheel having a pivot shaft offset relative to the wheel rotational axis, in accordance with the invention.
Figure 2B:
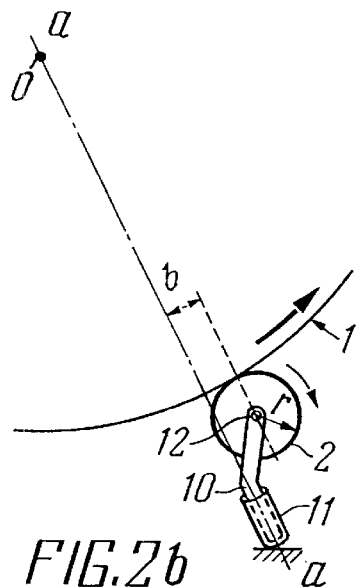
Figure 11:
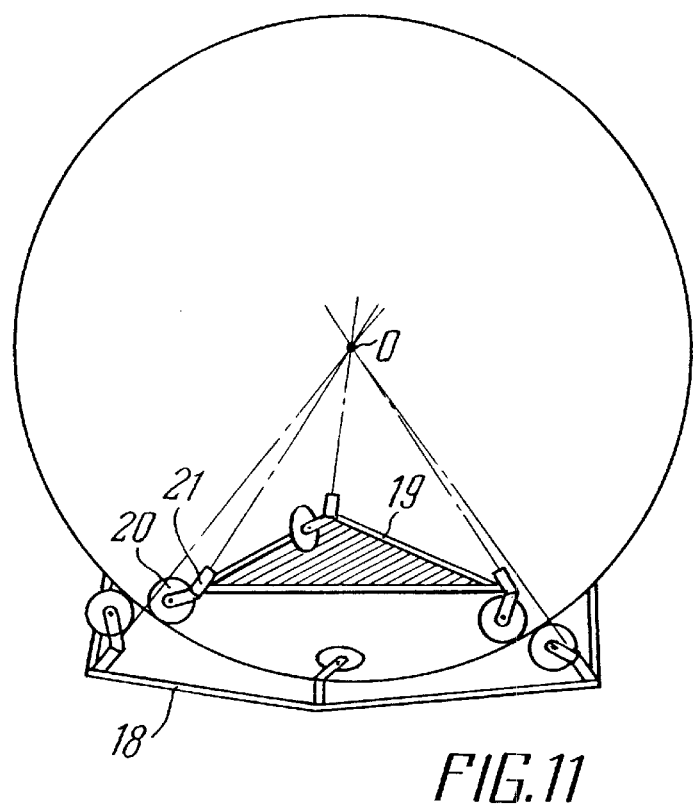
FIG. 11 shows a general view of a platform installed inside the capsule on the wheel supports, in accordance with the invention.

The system also comprises a platform 19 (FIG. 11) installed inside the capsule 1 on wheel supports 20 which have pivot shafts 21 directed toward the centre "O" of the sphere and offset relative to the wheel rotational axis by a value approximately equal to wheel radius r, in the manner like that shown in FIG. 2a. The platform 19 serves to arrange an additional equipment, such as a chair, motorcycle, saddle, skies, skateboard, etc.

In the case the capsule will be used to make toys, positioned on the platform may be a doll, a car, a toy animal.

Figure 12B:
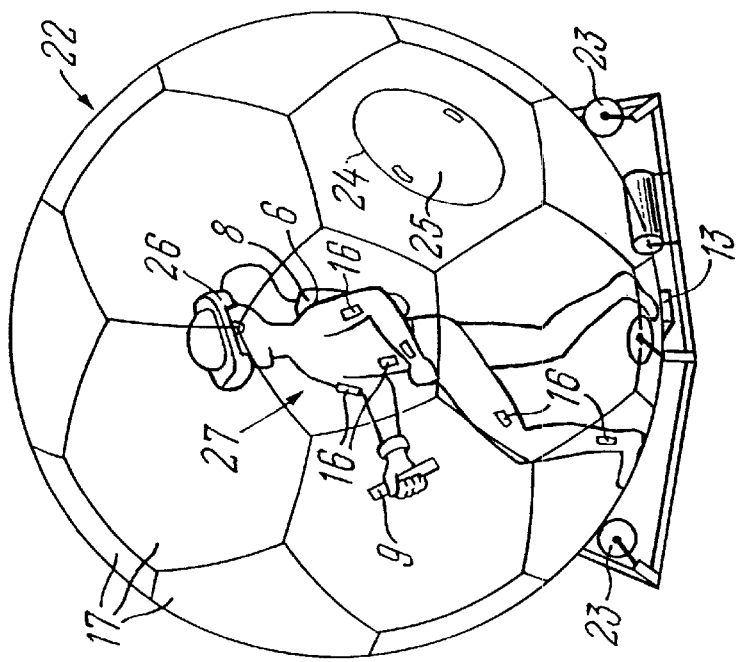
FIG. 12 shows two closed capsules to accommodate two users, connected to a single virtual environment generating means, in accordance with the invention.
Figure 12A:
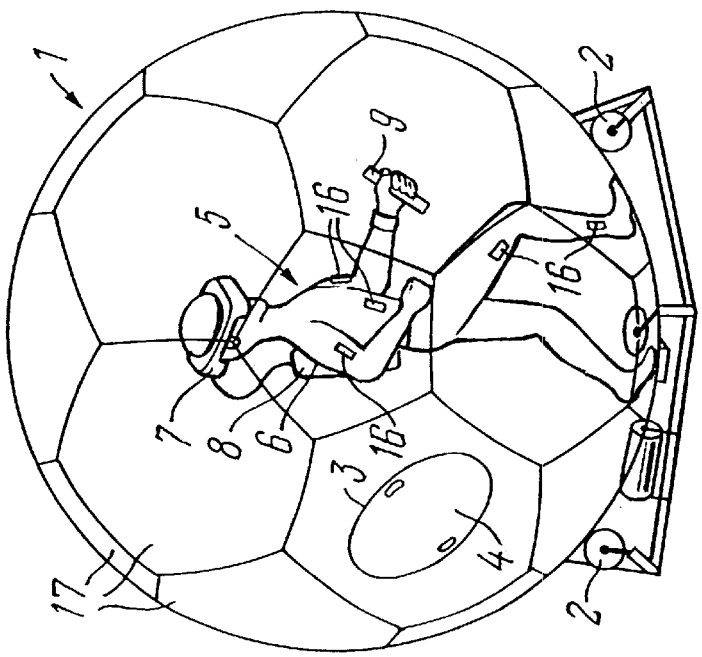

In one embodiment, the system comprises at least one additional sphere-shaped closed capsule 22 (FIG. 12) defining a real closed environment, in accordance with a number of additional users 5. The additional capsule 22 also rests on supports 23 so that to rotate around its centre and comprises at least one hatch 24 equipped with a door 25.

In this case, the system comprises at least one additional means 26 to display a virtual environment to an additional user 27, the means 26 being connected to the virtual environment generating means 6 to provide interactive interactions between the users 5 and 27.

The system comprises a pulse sensor 28 (FIG. 1) and/or a blood pressure sensor 29 connected to the virtual environment changing unit 8 to adjust the virtual reality displayed to the user 5.

Figure 13:
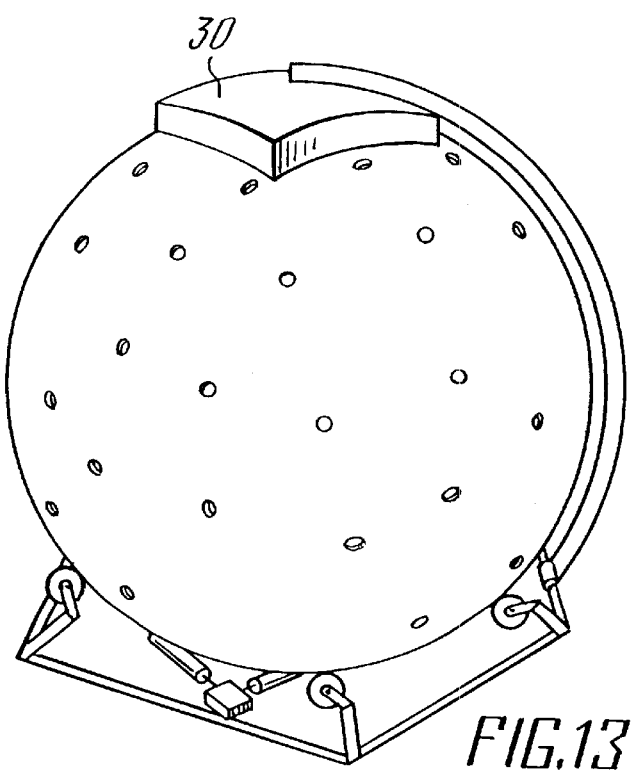
FIG. 13 shows a capsule with temperature and air content control means mounted thereon, in accordance with the invention.

The system further comprises means 30 (FIG. 13) to control temperature and air content in the sphere, which is an air conditioner in the embodiment described.

The capsule 1 is made of a radio transparent material to provide communications with the sensors, the user 27 in the second capsule 22, and with an Internet-type network or an external computer (not shown in FIG. 1).

The system includes a driver, a computer program to adapt and to make the invented system for immersion in virtual reality compatible with available virtual reality programs.

Figure 14:
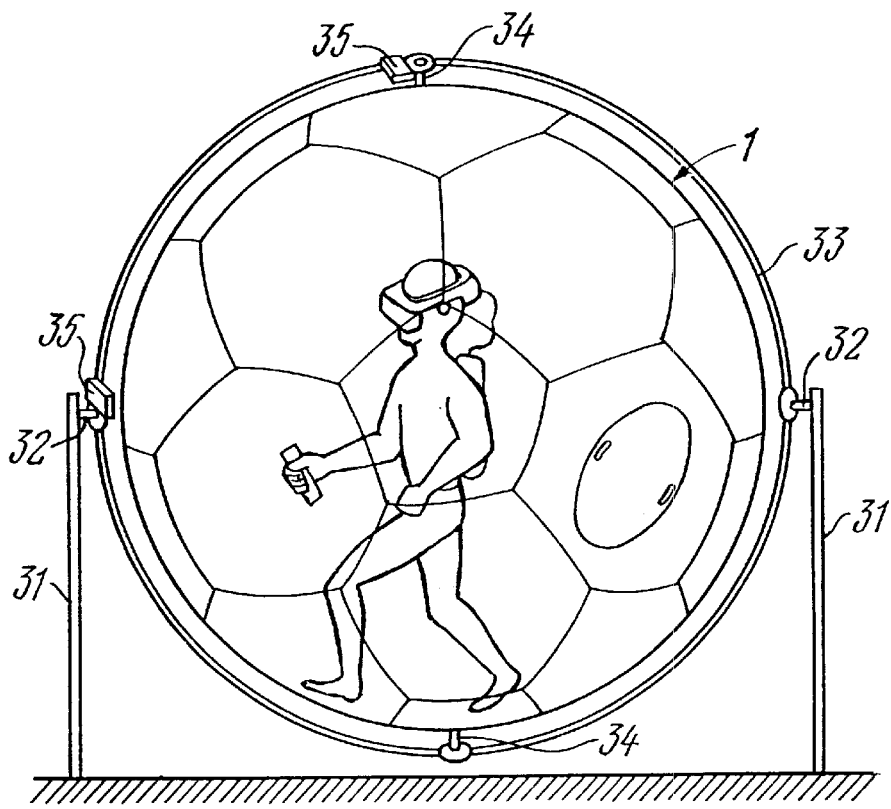
FIG. 14 shows a gyroscopic support for the capsule, in accordance with the invention.

The system may be implemented with the capsule 1 resting on a gyroscopic support. In this case, the support comprises two posts 31 (FIG. 14) on which axles 32 are secured. A ring-shaped frame 33 is mounted so that to rotate on the axles 32. A second pair of axles 34 secured on the frame 33 is displaced relative to the first pair of the axles 32 by an angle of 90 degrees. The capsule 1 is rotatable on the axles 34. Arranged on the frame 33 are sensors 35 for determining a rotation angle of the sphere.

Figure 15:
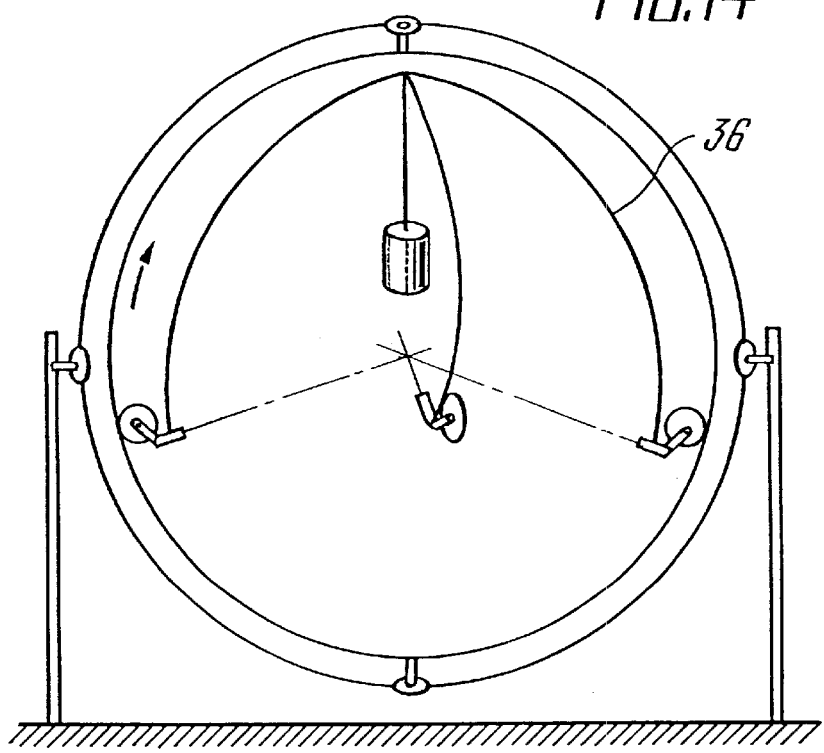
FIG. 15 shows an embodiment of a movable support for mounting an additional equipment, in accordance with the invention.

A movable support 36 may be located inside the capsule 1 (FIG. 15) to secure additional devices thereon.

A system for immersing a user in virtual reality in accordance with the invention provides a new profitable way to present advertisements to a wide circle of people. The system will be most frequently installed in places convenient to observe: in video game rooms, big shops, on streets near houses. The sphere has a large area onto which an advertisement may be placed. As the sphere will rotate from time to time, it will naturally attract attention of passers-by and visitors.

The means 13 for determining a sphere rotation amount and direction may be implemented as sensors detecting an amount and direction of rotation of at least one wheel in one of the supports 2.

To make user's entry into and exit out the sphere more convenient, the system may be provided with a brake (not shown in FIG. 1) to anchor the sphere for a time in a certain position.

The system for immersing a user in virtual reality in accordance with the invention operates in the following manner.

A capsule 1 (FIG. 1) is made from panels 17 to define a real environment. The capsule 1 is installed of supports 2 so that to rotate around its centre "O" with three degrees of freedom.

A user 5 enters the capsule 1 and can freely move over the inner surface of the capsule 1.

A computer generates a virtual environment in which objects and subjects, such as walls of buildings, trees, cars, animals, people, clouds, etc,. appear and move in a predetermined and random way.

The generated virtual environment is displayed on the display screens so that the user sees a three-dimensional picture of the virtual world.

The virtual environment is being continuously changed in accordance with a loaded program. As the user does not see the screen boundaries owing to a perfect helmet structure, he has an illusion of being in the virtual three-dimensional environment. A desire appears to actively interact with the virtual environment objects and subjects, e.g. to touch the trees, to come closer to an object, to take it in hands, to dance with a virtual partner, to fly in aircraft, etc.

In response to changes in positions of objects and subjects in the virtual environment, the user alters his position in real and virtual environment, making real physical movements by parts of his body and eyes. Making real steps, the user approaches the virtual environment objects and subjects. By making a step, the user rotates the capsule beneath him, i.e. in the direction opposite to his motion. Such a motion of the capsule is possible owing to the fact that the capsule rests on movable wheel supports which easily and freely follow the capsule pivots in any direction.

When the user moves relative to the capsule, his centre of gravity displaces relative to the vertical passing through the capsule centre. This gives rise to a moment of force tending to turn the capsule so that the user's centre of gravity displaces towards the vertical. In should be taken into account that the friction between the sole and the capsule during walking considerably exceeds the friction between the capsule and wheel support.

An amount and direction of movement of the user 5 relative to the capsule 1 are being detected, and the virtual environment is continuously adjusted accordingly and displayed to the user.

Physical loads on the user can be dosed and monitored through changes in a computer game story. By way of example, if it is recommended to increase a load on the user, the program logic can be designed so that the story will force the user to speed.up his actions. In the "action" games, the user may be forced to perform more actively by increasing a number of virtual rivals he is to combat, attack or retreat.

If a load imposed on a user by a current story is in excess of the recommended one, the game will be changed to a more smooth course. By the end of the optimal load, the game story should be adjusted so that to evoke a feeling of satisfaction with the game played. The user may be congratulated with the end of the game and invited to participate in the game next day. The load may be selected in accordance with the user's age and physiological rates, and more expediently, with recommendations of a personal doctor. Account should be taken not only of a physical load, but also of emotional stresses, and stresses on eyes.

Virtual reality computer games can be designed for any age and sex. They can be not only games, but also special entertainment and educational programs, for example, walking or jogging with a guide over a virtual town. The jogging tempo may be set by a virtual guide.

The virtual environment can be downloaded to the display means 7 not only from the computer, secured on the user, but also from means for access to an Internet-type computer network over a wireless link.

INDUSTRIAL APPLICABILITY

Using a system in accordance with the invention, a new method can be implemented to present a viewer with a show which is built on the possibility of natural movement of the user on his own feet over a virtual environment. The viewer may be presented with a picture of user's movement over the virtual environment and interaction with the environment objects and subjects. Simultaneously, the user's natural movements, mimics and emotional state will be shown to the viewer. Such telecasts and real-time transmissions sent over computer networks will be particularly entertaining.

The telecasts can display immersion and interaction of users in several spheres in a single virtual environment. Such show programs may be topical, e.g. immersion in a 3-D environment of a known computer game. The telecasts can be convenient means to present a new virtual reality computer game to users. Producers of 3-D games may use the telecasts for advertising and marketing their products. In such a show, in pace with real actions of the user in the virtual environment, a viewer can be shown actions of several types: by user's eyes, actual actions of the users, their mimics, different aspects of the virtual environment and a combination of real and virtual images.

When seeing a virtual environment, the viewers can be provided with a possibility to interactively select angles of view.

What is claimed is:

1. A system for immersing a user in virtual reality, comprising:

a closed sphere-shaped capsule defining a real environment, the capsule being disposed on supports so as to rotate around its center, and having at least one closable opening for entry and exit of the user;

a virtual environment generator for generating a virtual environment;

a virtual environment display for displaying the virtual environment to the user and connected to the virtual environment generator;

a virtual environment changing unit for changing the virtual environment responsive to actual physical movements made by the user inside the capsule;

a user's movement amount and direction determining sensor for determining an amount and direction of a movement of the user relative to the capsule, said sensor being connected to the virtual environment changing unit; and at least three wheel supports each having a wheel, each support having a pivot shaft directed toward the center of the sphere-shaped capsule and offset relative to a rotational axis of its wheel.

2. The system as set forth in claim 1, further comprising a sphere rotation angle sensor different from said user's movement amount and direction determining sensor, said sphere rotation angle sensor connected to the virtual environment changing unit and configured to sense an angle of rotation of the sphere-shaped capsule, the sphere rotation angle corresponding to an amount and direction of user's movement relative to an inner surface of the sphere-shaped capsule.

3. The system as set forth in claim 1, wherein said user's movement amount and direction determining sensor comprises a plurality of sensors determining positions of parts of the user's body.

4. The system as set forth in claim 1, wherein said user's movement amount and direction determining sensor is a mouse having two rollers mounted perpendicular to one another and configured to rotate and contact a sphere surface, the sphere-shaped capsule being used as a ball of the mouse.

5. The system as set forth in claim 1, wherein said capsule comprises a set of at least one type of identical panels rigidly connected to one another and having a surface curvature specified by a predetermined curvature of the sphere-shaped capsule.

6. The system as set forth in claim 5, wherein said panels are selected from the group including triangles, rectangles, pentagons and hexagons.

7. The system as set forth in claim 1, wherein said wheel supports are secured on a frame.

8. The system as set forth in claim 1, further comprising:
at least one additional closed sphere-shaped capsule for an additional user, said additional capsule defining a real environment and being disposed on supports so as to rotate around its center, the additional capsule having at least one closable opening for entry and exit of the user; and
at least one additional display for displaying the virtual environment to the additional user, connected to said virtual environment generator to provide interaction between the users.

9. The system as set forth in claim 1, further comprising at least one of a pulse sensor and a blood pressure sensor connected to said virtual environment changing unit to adjust the virtual environment displayed to the user.

10. The system as set forth in claim 1, comprising temperature and air content controls for controlling the temperature and air content in the sphere-shaped capsule.

11. The system as set forth in claim 1, comprising a driver for adapting available programs for immersion in the virtual environment using the sphere-shaped capsule.

12. The system as set forth in claim 1, wherein the sphere-shaped capsule comprises at least three identical panels each having a first shape and a surface curvature specified by a predetermined curvature of the capsule.

13. The system as set forth in claim 12, wherein the sphere-shaped capsule further comprises a plurality of identical panels having a second shape which is different from the first shape.

14. The system as set forth in claim 13, wherein the first shape is hexagonal and the second shape is pentagonal.

15. The system as set forth in claim 1, wherein said at least three wheel supports and wheels are passive such that rotation of the capsule around its center is caused principally by movement of the user within the capsule and without the application of an external drive force to the capsule.

16. A system for immersing a user in virtual reality, comprising:
a closed sphere-shaped capsule defining a real environment, the capsule being disposed on supports so as to rotate around its center, and having at least one closable opening for entry and exit of the user;
a virtual environment generator for generating a virtual environment;
a virtual environment display for displaying the virtual environment to the user and connected to the virtual environment generator;
a sphere rotation angle sensor connected to the virtual environment changing unit, the sphere rotation angle corresponding to an amount and direction of user's movement relative to an inner surface of the sphere-shaped capsule, wherein said sphere rotation angle sensor is a mouse comprising two rollers mounted perpendicular to one another and configured to rotate and contact a sphere surface, the sphere-shaped capsule being used as a ball of the mouse;
a virtual environment changing unit for changing the virtual environment responsive to actual physical movements made by the user inside the capsule;
a user's movement amount and direction determining sensor, different from said sphere rotation angle sensor, for determining an amount and direction of a movement of the user relative to the capsule, said sensor being connected to the virtual environment changing unit; and
at least three wheel supports each having a wheel, each support having a pivot shaft directed toward the center of the sphere-shaped capsule and offset relative to a rotational axis of its wheel.

17. A system for immersing a user in virtual reality, comprising:
a closed sphere-shaped capsule defining a real environment, the capsule being disposed on supports so as to rotate around its center, and having at least one closable opening for entry and exit of the user;
a virtual environment generator for generating a virtual environment;
a virtual environment display for displaying the virtual environment to the user and connected to the virtual environment generator;
a virtual environment changing unit for changing the virtual environment responsive to actual physical movements made by the user inside the capsule;
a user's movement amount and direction determining sensor for determining an amount and direction of a movement of the user relative to the capsule, said sensor being connected to the virtual environment changing unit;
at least three wheel supports each having a wheel, each support having a pivot shaft directed toward the center of the sphere-shaped capsule and offset relative to a rotational axis of its wheel; and
a platform installed inside the sphere-shaped capsule on platform wheel supports each having a wheel, each platform wheel support having a pivot shaft directed toward the center of the sphere-shaped capsule and offset relative to a rotational axis of its wheel.

18. A system for immersing a user in virtual reality, comprising:
a closed sphere-shaped capsule defining a real environment, the capsule being disposed on supports so as to rotate around its center, and having at least one closable opening for entry and exit of the user;
a virtual environment generator for generating a virtual environment;
a virtual environment display for displaying the virtual environment to the user and connected to the virtual environment generator;
a virtual environment changing unit for changing the virtual environment responsive to actual physical movements made by the user inside the capsule;
a user's movement amount and direction determining sensor for determining an amount and direction Of a movement of the user relative to the capsule, said sensor being connected to the virtual environment changing unit; and at least three wheel supports each having a wheel, each support having a pivot shaft directed toward the center of the sphere-shaped capsule and offset relative to a rotational axis of its wheel, wherein said capsule is made of a radio-transparent material.

19. A system for immersing a user in virtual reality, comprising:

a closed sphere-shaped capsule defining a real environment, the capsule being disposed on gyroscopic supports so as to rotate around its center, and having at least one closable opening for entry and exit of the user;

a virtual environment generator for generating a virtual environment;

a virtual environment display for displaying the virtual environment to the user, said display being connected to the virtual environment generator;

a virtual environment changing unit changing the virtual environment responsive to actual physical movements made by the user inside the capsule;

a sensor for determining an amount and direction of user's movement relative to the capsule, said sensor being connected to said virtual environment changing unit; and a platform on wheel supports installed inside the sphere-shaped capsule, wherein rotation of the capsule around its center is caused principally by movement of the user within the capsule and without the application of an external drive force to the capsule.

20. A system for immersing a user in virtual reality, comprising:

a closed sphere-shaped capsule defining a real environment, the capsule being disposed on supports so as to rotate around its center, and having at least one closable opening for entry and exit of the user;

a virtual environment generator for generating a virtual environment;

a virtual environment display for displaying the virtual environment to the user, said display being connected to the virtual environment generator;

a virtual environment changing unit changing the virtual environment responsive to actual physical movements made by the user inside the capsule;

a sensor for determining an amount and direction of user's movement relative to the capsule, said sensor being connected to said virtual environment changing unit; and a platform on wheel supports installed inside the sphere-shaped capsule.

21. A system for immersing a user in virtual reality, comprising:

a closed sphere-shaped capsule defining a real environment, the capsule being disposed on supports so as to rotate around its center, and having at least one closable opening for entry and exit of the user;

a virtual environment generator for generating a virtual environment;

a virtual environment display for displaying the virtual environment to the user and connected to the virtual environment generator;

a virtual environment changing unit for changing the virtual environment responsive to actual physical movements made by the user inside the capsule;

a user's movement amount and direction determining sensor for determining an amount and direction of a movement of the user relative to the capsule, said sensor being connected to the virtual environment changing unit;

at least three wheel supports each having a wheel; and a sphere rotation angle sensor different from said user's movement amount and direction determining sensor, said sphere rotation angle sensor connected to the virtual environment changing unit and configured to sense an angle of rotation of the sphere-shaped capsule, the sphere rotation angle corresponding to an amount and direction of user's movement relative to an inner surface of the sphere-shaped capsule, wherein said sphere rotation angle sensor is a mouse comprising two rollers mounted perpendicular to one another and configured to rotate and contact a sphere surface, the sphere-shaped capsule being used as a ball of the mouse.

* * * * *